United States Patent [19]

Kosaka et al.

[11] 4,059,415
[45] Nov. 22, 1977

[54] APPARATUS FOR REFORMING COMBUSTIBLE INTO GASEOUS FUEL BY REACTION WITH DECOMPOSITION PRODUCT OF HYDROGEN PEROXIDE

[75] Inventors: Katuaki Kosaka, Hidaka; Fumio Wagatsuma, Tokyo; Mithuo Shimomoto, Sayama; Osamu Harada, Kawagoe; Zene Ueno, Fuchu, all of Japan

[73] Assignee: Nissan Motor Co., Ltd., Yokohama, Japan

[21] Appl. No.: 690,791

[22] Filed: May 27, 1976

[30] Foreign Application Priority Data

May 28, 1975 Japan .................. 50-63037

[51] Int. Cl.$^2$ ............ B01J 7/00; C10J 3/50; F02B 43/08; F02C 3/26
[52] U.S. Cl. .................. 48/63; 23/281; 48/95; 48/111; 48/196 R; 48/DIG. 4; 60/39.46 M; 60/39.46 S; 123/3
[58] Field of Search .......... 23/281, 284; 48/94, 48/95, 105, 107, DIG. 4, 63, 64, 78, 206; 60/39.46 M, 39.46 S; 123/3, 119 E

[56] References Cited

U.S. PATENT DOCUMENTS

| | | | |
|---|---|---|---|
| 2,721,788 | 10/1955 | Schad | 23/281 |
| 2,801,158 | 7/1957 | Grossman et al. | 48/DIG. 4 |
| 2,890,929 | 6/1959 | Rummert | 23/284 X |
| 2,897,062 | 7/1959 | Minarik | 23/284 X |
| 2,972,227 | 2/1961 | Allen | 60/39.46 M X |
| 3,040,521 | 6/1962 | Broughton et al | 23/281 X |
| 3,271,951 | 9/1966 | Nettel | 60/39.46 S |
| 3,447,316 | 6/1969 | White | 60/39.46 M |
| 3,778,038 | 12/1973 | Eversole et al. | 123/119 E UX |
| 3,898,794 | 8/1975 | Ariga | 60/39.46 M X |
| 3,980,064 | 9/1976 | Ariga et al. | 123/119 E X |
| 3,985,107 | 10/1976 | Ueno et al. | 123/119 E X |

*Primary Examiner*—Joseph Scovronek
*Attorney, Agent, or Firm*—Lowe, King, Price & Markva

[57] ABSTRACT

Apparatus for converting a combustible material such as a hydrocarbon or carbon fuel into a gaseous fuel containing $H_2$ and/or $CO$ by reaction with a heated mixture of $O_2$ and $H_2O$ prepared by decomposition of $H_2O_2$, characterized by the provision of a venturi section located upstream of the entrance to a reaction chamber for increasing the velocity of the flow of the $O_2$—$H_2O$ mixture and arrangement of the combustible feed line to add the combustible to the mixture at the venturi.

3 Claims, 7 Drawing Figures

APPARATUS FOR REFORMING COMBUSTIBLE INTO GASEOUS FUEL BY REACTION WITH DECOMPOSITION PRODUCT OF HYDROGEN PEROXIDE

This invention relates to a fuel-reforming apparatus for preparing a gaseous fuel containing as combustible components hydrogen and/or carbon monoxide by incomplete combustion of a hydrocarbon or carbon fuel with the decomposition product of hydrogen peroxide.

As is known, various combustible materials including those which are commonly used as fuels can be converted into a gaseous fuel which contains as combustible components hydrogen and/or carbon monoxide and has the advantages of a large calorific value per unit volume and excellent combustibility accompanied by little formation of pollutants. Such a gaseous fuel will hereinafter be called reformed gas. Examples of combustible materials useful as raw materials of reformed gas are as follows: petroleum fuels such as natural gas, LPG, gasoline, kerosene, light oil and heavy oil; synthetic fuels typified by synthetic gasoline; alcohols typified by ethanol, solid fuels such as coal, coke, peat and charcoal; organic materials exemplified by lumber, pulp, paper and certain synthetic resins; and miscellaneous substances including tar, city refuse and agricultural and stockbreeding wastes.

The reforming of these combustibles is accomplished in most cases by partial oxidation and/or water gas reaction.

The reforming of a hydrocarbon by partial oxidation is expressed generally as follows:

$$C_mH_n + m/2 O_2 = mCO + n/2 H_2 \qquad (1)$$

In the case of water gas reaction, which may be regarded as partial oxidation by water, $$C_mH_n + mH_2O = mCO + (m + n/2)H_2 \qquad (2)$$

When a hydrocarbon is made to react with both oxygen and water, a general equation showing the reforming is as follows:

$$C_mH_n + jO_2 + kH_2O = pCO + rH_2 \qquad (3)$$

The reaction according to Equation (1) is exothermic but the reaction of Equation (2) is endothermic. Accordingly, it is possible to make the reaction of Equation (3) proceed self-sustainingly by using oxygen and water in appropriate quantities and selecting a suitable reaction condition.

When a carbon fuel such as coal is used as the raw material of a reformed gas, the following reactions should be taken into consideration in planning a reforming process.

$$C + O_2 = CO_2 + 97.0 \text{ Kcal/mol} \qquad (4)$$

$$C + \tfrac{1}{2}O_2 = CO + 29.39 \text{ Kcal/mol} \qquad (5)$$

$$C + CO_2 = 2CO - 38.22 \text{ Kcal/mol} \qquad (6)$$

$$C + H_2O = CO + H_2 - 28.36 \text{ Kcal/mol} \qquad (7)$$

The exothermic reactions according to Equations (4) and (5) can sustain the endothermic reactions of Equations (6) and (7). Accordingly, a reforming reaction with respect to a carbon fuel can proceed self-sustainingly and gives a reformed gas which is composed mainly of CO and $H_2$ when the reforming reaction is shared appropriately by the fundamental reactions of Equations (4) – (7).

In most cases air is used as the oxidizing agent for accomplishing the reforming of fuels. It is known, however, that hydrogen peroxide $H_2O_2$ is a highly advantageous oxygen source for the reforming of fuels. Hydrogen peroxide is a strong oxidizing agent in the form of liquid at room temperature and readily decomposes in the presence of a catalyst.

$$2H_2O_2 \rightarrow 2H_2O + O_2 \qquad (8)$$

This decomposition reaction is highly exothermic, so that the decomposition product is a mixture of heated steam and heated oxygen gas. For example, the temperature of the mixture is about 700° C when 90% $H_2O_2$ (by weight) solution is decomposed. Thus, hydrogen peroxide can provide both oxygen and water (steam) needful for a fuel-reforming reaction. It is a usual way to bring the decomposition product according to Equation (8) into contact with a fuel to be reformed, but the reforming of a hydrocarbon fuel by the use of hydrogen peroxide may generally be expressed as follows:

$$C_mH_n + m/2 H_2O_2 \rightarrow mCO + (m + n/2)H_2 \qquad (9)$$

The reaction according to Equation (9) is exothermic.

In fuel-reforming processes using air and water (or steam) based on the reactions of Equations (1) – (3), it is usually necessary to preheat the respective reactants for maintaining stable reactions. A reforming apparatus, therefore, needs to include a heat generator for preheating the reactants and/or heat exchangers for heat transfer from the reaction product to the reactants. The use of hydrogen peroxide as shown by Equation (9) has the advantages that the need of external heat and/or the provision of heat exchangers can be eliminated or greatly lowered and that the obtained reformed gas has a larger calorific value per unit volume because of containing no incombustible component such as nitrogen. Besides, hydrogen peroxide which is a liquid at room temperature can easily be supplied to a reactor at optionally raised pressures simply by pumping. Accordingly, a reforming apparatus can be made compact enough to be practicable as a fuel system of a vehicular engine by the use of hydrogen peroxide. As a different application of a reforming process based on the reaction of Equation (9), it will be possible to utilize various wastes and refuses as clean energy resources by converting them into reformed gas on an industrial scale.

In a fuel-reforming reaction or partial oxidation reaction, oxygen is used generally in a quantity as small as about $\tfrac{1}{4}$ to $\tfrac{1}{3}$ of the quantity of oxygen necessary to accomplish complete oxidation of the same fuel. Therefore, the mixing or contact of the fuel to be reformed with oxygen (and water) is a matter that requires consideration. The efficiency of the reforming remains on an unsatisfactory level when the fuel and an oxidizing agent (and water) are separately supplied to a reaction chamber. The combustion in the reaction chamber occurs inevitably as diffusion combustion when the reactants are introduced into the reaction chamber in such a manner. Consequently, a portion of the fuel undergoes complete combustion in certain regions of the reaction chamber where a relatively high oxygen/fuel ratio is realized, while the remaining portion of the fuel is heated (by the heat of the complete oxidation) in the presence of an extremely small quantity of oxygen and hence partly decomposes to liberate a considerable amount of solid carbon.

It is an object of the present invention to provide an improved apparatus for reforming a combustible material of the described type into a gaseous fuel containing as combustible components hydrogen and/or carbon monoxide by reaction with the decomposition product of hydrogen peroxide, which apparatus is characterized by the ability of rapidly and thoroughly mixing the combustible with the decomposition product of hydrogen peroxide prior to the introduction of them into a reaction chamber of the apparatus.

The present invention is concerned with apparatus for carrying out the reforming of a combustible material into a gaseous fuel containing as combustible components hydrogen and/or carbon monoxide by reaction of the combustible material with a heated mixture of oxygen and steam prepared by the decomposition of hydrogen peroxide, which apparatus includes a reaction chamber adapted to carry out a reforming reaction, a reactor adapted to carry out the decomposition of hydrogen peroxide, a fluid passage connecting the reactor to the reaction chamber and a circuit for feeding the combustible material to the reaction chamber. According to the invention, the apparatus comprises a venturi section formed in the fluid passage such that the velocity of a flow of the heated oxygen-steam mixture is increased at the venturi section, and the combustible material feed circuit is arranged such that the combustible material is introduced into the fluid passage at the venturi section, so that the oxygen-steam mixture and the combustible material are rapidly and uniformly mixed with each other prior to the admission into the reaction chamber.

The venturi section may be shaped such that the velocity of the flow of the oxygen-steam mixture can reach the velocity of sound at the venturi section. In such a case, a valve member may be disposed in the fluid passage to move transversely to the cross section of the venturi section in order to control the mass flow rate of the oxygen-steam mixture by controlling the position of the valve member to vary the effective cross-sectional area of the venturi section.

Another venturi section may be formed at a section downstream of the aforementioned venturi section in order to add heated air to the mixture of oxygen, steam and the combustible material. A swirl-producing chamber may be formed at a section upstream of the firstly described venturi section to further enhance the mixing efficiency.

Other features and advantages of the invention will become apparent from the following detailed description of preferred embodiments with reference to the accompanying drawings, wherein.

Figure 1:
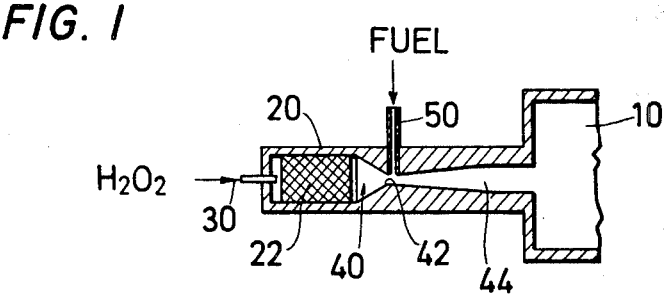
FIG. 1 is a fragmentary and sectional sketch of a fuel-reforming apparatus showing the fundamental concept of the invention.

Apparatus of FIG. 1 has a reaction chamber 10 and a separate reactor 20 which contains therein a catalyst 22 for the decomposition of hydrogen peroxide such as a nickel base or a silver base catalyst. Hydrogen peroxide is supplied to the reactor 20 through line 30, and the decomposition product which is a heated mixture of oxygen gas and steam is passed to the reaction chamber 10 through a passage 40. Hydrogen peroxide is usually used in the form of an aqueous solution in a concentration of about 30 to about 90%. The apparatus is not different in these respects from fuel-reforming apparatus of known types.

According to the invention, a venturi section 42 is formed in the passage 40 at a section relatively close to the outlet of the reactor 20 in order to increase the velocity of the oxygen-steam stream in this passage 40. A fuel feed line 50 is arranged to join the oxygen-steam passage 40 at, or approximately at, the constricted throat of this venturi section 42. A major portion 44 of the passage 40 extending from the venturi section 42 to the entrance to the reaction chamber 20 is designed to serve as a fluid mixing tube. This portion 44 starts from the constricted throat of the venturi section 42 and the cross-sectional area of the passage 40 in this portion 44 continuously increases as the distance from the throat increases.

In this apparatus, a combustible material subject to a reforming reaction is introduced into the passage 40 at the venturi section 42 where the flow of the heated oxygen-steam mixture has a high velocity, so that the combustible is rapidly mixed with the oxygen-steam mixture and, in many cases, mostly vaporized by the heat of the oxygen-steam mixture. To aid a thorough mixing of the reactants, the venturi section 42 and the mixing tube section 44 are designed usually such that the gaseous mixture of the reactants passes through the mixing tube section 44 at a velocity ranging from tens of meters per second to the velocity of sound. If the velocity of the flow of the mixture in this section 44 is too low, there is a fear of the occurrence of back-fire from the reaction chamber 10 into the passage 40. The mixing tube section 44 should not have unnecessarily curved regions or unduly expanded sections. Otherwise, the heated mixture of the reactants may stagnate in the mixing tube section 44 to result in a spontaneous ignition out of the reaction chamber 10.

Figure 2:
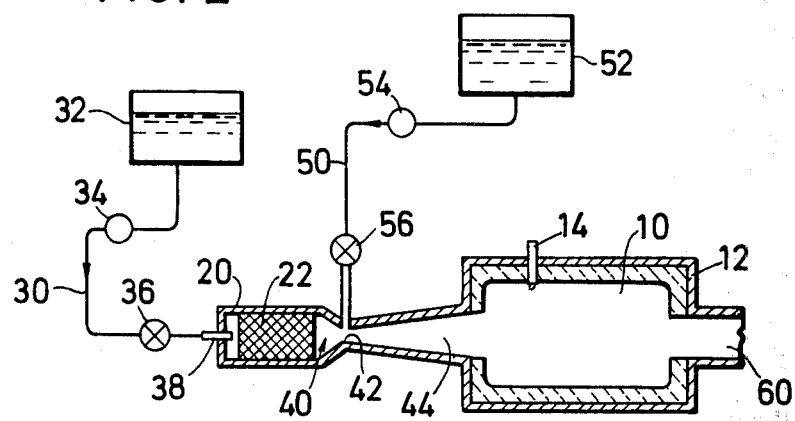
FIG. 2 is a diagrammatic presentation of a fuel-reforming apparatus as a preferred embodiment of the invention.

FIG. 2 shows a reforming apparatus according to the invention for reforming a liquid fuel. The hydrogen peroxide line 30 includes a reservoir 32, a pump 34 a flow control valve 36 and a discharge nozzle 38 opening into the reactor 20. The fuel line 50 includes a fuel tank 52, a pump 54, and a flow control valve 56. The reaction chamber 10 takes the form of a combustion chamber surrounded by refractory walls 12 and is equipped with a spark plug 14 at a location relatively close to the entrance. Line 60 is arranged to supply the reformed gas to a combustion engine (not shown), for example.

Hydrogen peroxide and a liquid fuel are supplied to the apparatus in a regulated proportion by means of the control valves 36 and 56. At an initial stage of a reforming process, hydrogen peroxide is supplied in a relatively large quantity so that the molar ratio of hydrogen peroxide to the liquid fuel may be in the range from about ⅔ to 4/5 of a stoichiometric ratio for complete oxidation of the fuel. The employment of such a mixing ratio assures the spark-ignition of the mixture of the reactants in the reaction chamber 10 even though the mixture and the reaction chamber 10 are not yet sufficiently heated. When a warm-up operation is completed, the molar ratio of hydrogen peroxide to liquid fuel is lowered to about ¼ to ⅓ of the aforementioned stoichiometric ratio so that a larger portion of the fuel may undergo partial oxidation. Of course it is desired that the fuel be entirely consumed in producing hydrogen and carbon monoxide (when the fuel is a hydrocarbon fuel).

Figure 3:
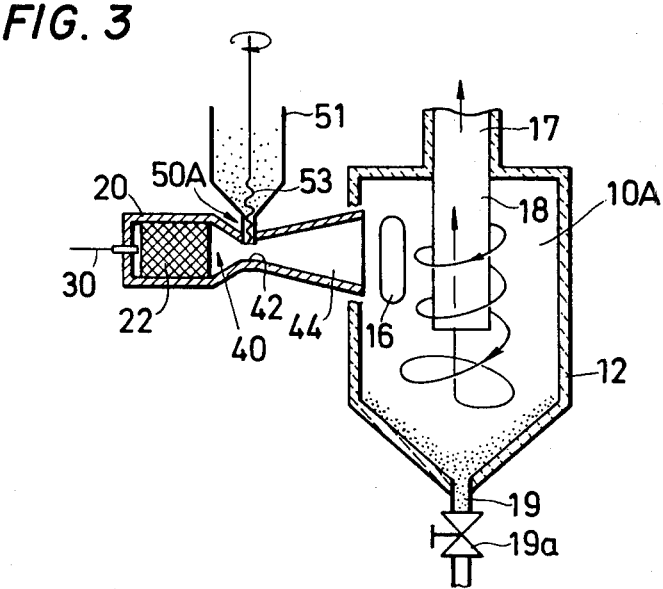
FIGS. 3 to 6 are respectively four differently modified reforming apparatus also embodying the invention.

Apparatus of FIG. 3 is designed for accomplishing the reforming of a solid fuel such as coal which is used in the form of powder or granules. When the fuel is brown coal which undergoes reforming reaction relatively easily, the coal particles are preferably smaller in size than about 5 mm. With respect to coal of lower reformability, the particles size should be made smaller than about 1 mm. The fuel supply system 50A in the apparatus of FIG. 3 comprises a hopper 51 and a screw conveyer 53. Also in this case, the fuel supply system 50A is arranged such that the fuel powder is introduced into the fluid passage 40 substantially at the constricted throat of the venturi section 42. The reaction chamber of this apparatus preferably takes the form of a cyclone 10A. The inlet 16 of the reaction chamber 10A is formed in the cylindrical wall of the cyclone 10A such that the mixture of the reactants is introduced into the reaction chamber 10A of the cyclone type generally tangentially. A hollow cyrindrical guide tube 18 is provided in the reaction chamber 10A along the central axis of the chamber 10A to cause the mixture of the reactants to whirl in the reaction chamber 10A. The reformed gas is discharged from the reaction chamber 10A through a gas outlet 17 formed in the top wall. Another outlet 19 is formed at the bottom of a funnel-shaped lowermost section with the provision of a stop cock 19a for discharge of slag from the reaction chamber 10A at intervals. Thus a reaction chamber 10A of this type is particularly advantageous for solid combustibles containing ash components.

Figure 4:
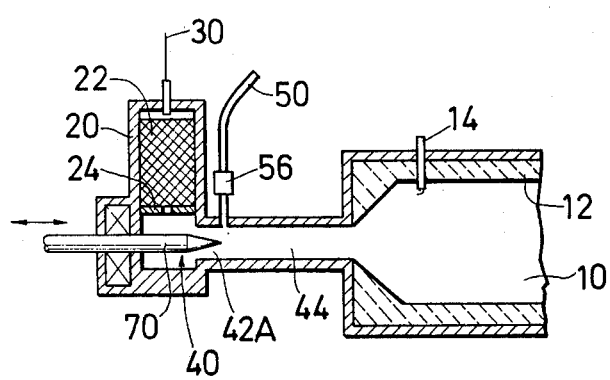

Apparatus of FIG. 4 is essentially similar to the apparatus of FIG. 2 but comprises a valve member 70 for the purpose of utilizing the venturi section 42A also as a component of a flow rate control device for the oxygen-steam mixture.

As is known, the mass flow rate of a compressive fluid at a constricted section of a stream tube is not affected by the pressure difference between the entrance and exit of the constricted section but exclusively depends on the effective cross-sectional area of the constricted section when the velocity of the fluid flow at the constricted section is approximately equal to the velocity of sound. The venturi section 42A in the passage 40 of this apparatus is designed to serve as a sonic nozzle so that the heated oxygen-steam mixture can pass through the venturi section 42A at a sonic velocity when the pressure in the reactor 20 is above a certain magnitude. The reactor 20 has a retainer 24 for supporting the catalyst 22 which is exposed to a high pressure. The valve member 70 is conveniently a conical member (a needle valve) and can be moved transversely to the cross-section of the venturi section 42A by a valve actuating mechanism (not shown).

Owing to the described and illustrated construction, the mass flow rate of the oxygen-steam mixture through the venturi section 42A, i.e. the molar ratio of hydrogen peroxide to the fuel, can very accurately be controlled merely by varying the position of the valve member 70 to vary the effective cross-sectional area of the venturi section 42A. The decomposition of hydrogen peroxide in the reactor 20 is regulated such that the pressure in the passage 40 at a section upstream of the venturi section 42A is distinctly higher than the pressure in the mixing tube section 44. This is necessary for preventing the mass flow rate of the oxygen-steam mixture at the venturi section 42A from being affected by variations in the pressure in the mixing tube section 44. As an additional advantage of an extremely high velocity flow of the heated gas realized by the provision of the sonic nozzle 42A, the mixing of the reactants can be accomplished ideally. Furthermore, the high velocity of the flow of the oxygen-steam mixture has a mechanically pulverizing effect on solid or liquid substances which are brought into contact with the flow, so that the apparatus of FIG. 4 is useful also for the reforming of solid combustibles of certain types.

Figure 5:
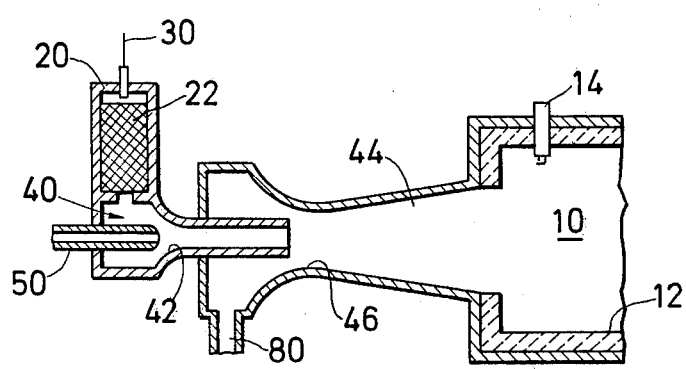

Apparatus of FIG. 5 is designed to carry out a reforming reaction by the use of air as an oxidizing agent in addition to the oxygen-steam mixture prepared by the decomposition of hydrogen peroxide. This apparatus has a second venturi section 46 which is formed in the passage 44 at a section downstream of the previously described venturi section 42. Line 80 is arranged to add heated air to the mixture of the oxygen, steam and fuel at the second venturi section 46. A mixture of heated air and steam may be used in place of the heated air. The preheating of air (and steam) supplied through the line 80 is accomplished by utilizing the heat of the reformed gas produced in the reaction chamber 10. The feed rates of hydrogen peroxide and air are controlled in correlation to each other so that the molar ratio of the total oxygen to the fuel may be maintained in a range suitable for the accomplishment of a highly efficient partial oxidation.

Although the addition of air results in a decrease in the calorific value per unit volume of the reformed gas due to the presence of nitrogen, this method has the advantage of a reduction in the cost of the oxidizing agent. The fundamental advantages of the use of hydrogen peroxide typified by a high temperature of the decomposition product can be maintained even in this method unless air is added in an excessively large proportion to hydrogen peroxide.

Figure 6:
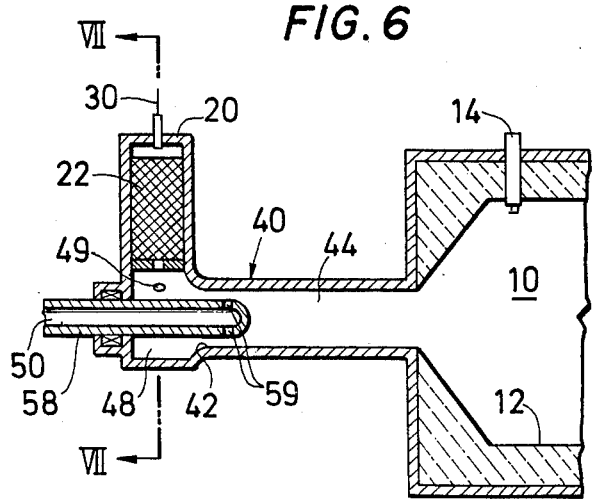
Figure 7:
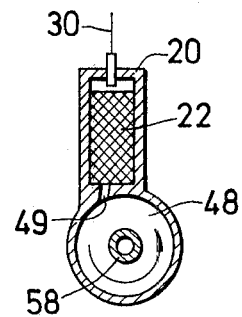
FIG. 7 is a cross-sectional view taken along the line 7—7 of FIG. 6.

In the apparatus of FIGS. 6 and 7, the fuel feed line 50 has a tubular fuel injector 58 which is movable in the axial direction of the venturi section 42. This injector 58 has a plurality of radial holes 59 formed in the closed end region of its tubular body. A generally cylindrical swirl-producing chamber 48 is formed in the passage 40 at a section upstream of the venturi section 42. The outlet of the reactor 20 communicates with the swirl chamber 48 through a port 49 which is formed such that the heated oxygen-steam mixture enters the swirl chamber 48 generally in the tangential direction as shown in FIG. 7.

The heated oxygen-air mixture supplied from the reactor 20 produces swirl prior to its arrival at the venturi section 42 and attains an increased velocity at the venturi section 42. The fuel can be introduced into the flow of the oxygen-steam mixture at an optional region in the venturi section 42. The mixture of the three reactants passes through the mixing tube section 44 in the form of a high velocity swirling flow so that the mixing of the reactants can be accomplished ideally thoroughly.

What is claimed is:

1. In an apparatus for carrying out the reforming of a combustible material into a gaseous fuel containing as combustible components at least one of hydrogen and carbon monoxide by reaction of the combustible material with a heated mixture of oxygen and steam prepared by the decomposition of hydrogen peroxide, the apparatus including a reaction chamber to carry out a reforming reaction, a catalytic reactor to decompose hydrogen peroxide into a heated mixture of oxygen and steam, a fluid passage connecting the reactor to the reaction chamber and a circuit for feeding the combustible material to the reaction chamber, the improvement comprising a venturi section formed in the fluid passage and a mixing section formed in the fluid passage adjacent and downstream of the constricted throat of said venturi section, the combustible material feed circuit opening into said venturi section substantially at the constricted throat thereof, said venturi section and mixing section being formed such that the velocity of a flow of a mixture of the combustible material and the oxygen-steam mixture in said mixing section is in the range of from 10m/sec to the velocity of sound, said combustible material feed circuit comprising a screw conveyor adapted to transfer a solid combustible in the form of fine particles, the reaction chamber being in the form of a cyclone, the fluid passage being arranged such that the mixture of the combustible material and the oxygen-steam mixture is introduced into the reaction chamber generally in a tangential direction; whereby the oxygen steam mixture and the combustible material are rapidly and uniformly mixed with each other prior to the admission into the reaction chamber.

2. A reforming apparatus as claimed in claim 1 wherein said combustible material feed line opens into said venturi section such that the combustible material is introduced into said venturi section in a direction generally normal to the direction of the flow of said heated mixture at said constricted throat.

3. A reforming apparatus as claimed in claim 1 wherein the cross-sectional area of said mixing section continuously increases as the distance from said constricted throat increases.

* * * * *